(12) United States Patent
Derieth et al.

(10) Patent No.: US 11,955,670 B2
(45) Date of Patent: Apr. 9, 2024

(54) METHOD OF CONTINUOUSLY PRODUCING BIPOLAR SEPARATOR PLATES FROM PLASTIC FILLED WITH ELECTRICALLY CONDUCTIVE PARTICLES

(71) Applicant: Eisenhuth GmbH & Co. KG, Osterode (DE)

(72) Inventors: Thorsten Derieth, Weeze (DE); Thorsten Hickmann, Osterode (DE)

(73) Assignee: EISENHUTH GMBH & CO. KG, Osterode (DE)

( * ) Notice: Subject to any disclaimer, the term of this patent is extended or adjusted under 35 U.S.C. 154(b) by 186 days.

(21) Appl. No.: 17/678,272

(22) Filed: Feb. 23, 2022

(65) Prior Publication Data
US 2022/0271301 A1 Aug. 25, 2022

(30) Foreign Application Priority Data
Feb. 25, 2021 (DE) .................. 10 2021 104 564.9

(51) Int. Cl.
| | |
|---|---|
| *H01M 8/02* | (2016.01) |
| *H01M 8/0213* | (2016.01) |
| *H01M 8/0221* | (2016.01) |
| *H01M 8/0226* | (2016.01) |
| *H01M 8/0247* | (2016.01) |

(52) U.S. Cl.
CPC ....... *H01M 8/0226* (2013.01); *H01M 8/0213* (2013.01); *H01M 8/0221* (2013.01); *H01M 8/0247* (2013.01)

(58) Field of Classification Search
CPC . H01M 8/0226; H01M 8/0221; B29C 43/003; B29K 2027/16; B29K 2507/04
USPC .......................................................... 429/518
See application file for complete search history.

(56) References Cited

U.S. PATENT DOCUMENTS

| | | | |
|---|---|---|---|
| 4,426,340 A | 1/1984 | Goller et al. | |
| 2003/0129471 A1 | 7/2003 | Kitade et al. | |
| 2005/0042496 A1* | 2/2005 | Bisara ................. | H01M 8/0213 264/105 |
| 2012/0156583 A1* | 6/2012 | Chen ................... | H01M 8/0228 264/254 |
| 2016/0156040 A1 | 6/2016 | Kopietz et al. | |

(Continued)

FOREIGN PATENT DOCUMENTS

| | | |
|---|---|---|
| DE | 102009051434 A1 | 5/2011 |
| DE | 102013107514 A1 | 1/2015 |
| EP | 2801121 A1 | 11/2014 |

(Continued)

OTHER PUBLICATIONS

European Search Report for co-pending, related EP Application No. EP 22 15 8395, dated Sep. 1, 2022.

*Primary Examiner* — James M Erwin
(74) *Attorney, Agent, or Firm* — Thomas | Horstemeyer, LLP

(57) ABSTRACT

For continuously producing a band-shaped plate material from plastic filled with electrically conductive particles, which can be sub-divided into bipolar separator plates or blanks for bipolar separator plates, the particles and the plastic are compounded into a compound, the compound is ground into a powder, the powder is spread out into a preform, and the preform is, preferably isobarically, hot-pressed between a lower belt and an upper belt of a double belt press into a plate material.

22 Claims, 7 Drawing Sheets

(56) References Cited

U.S. PATENT DOCUMENTS

2016/0233518 A1    8/2016  Breault

FOREIGN PATENT DOCUMENTS

| EP | 3627600 A1 | 3/2020 |
| WO | 03069707 A1 | 8/2003 |
| WO | 2015088421 A1 | 6/2015 |

* cited by examiner

METHOD OF CONTINUOUSLY PRODUCING BIPOLAR SEPARATOR PLATES FROM PLASTIC FILLED WITH ELECTRICALLY CONDUCTIVE PARTICLES

CROSS REFERENCE TO RELATED APPLICATIONS

This application claims priority to German patent application No. DE 10 2021 104 564.9 entitled "Verfahren zum kontinuierlichen Herstellen von Bipolarplatten aus mit elektrisch leitfahigen Partikeln versetztem Kunststoff" and filed on Feb. 25, 2021.

FIELD OF THE INVENTION

The invention relates to a method of continuously producing a band-shaped plate material which can be subdivided into bipolar separator plates or blanks for bipolar separator plates from plastic filled with electrically conductive particles.

Bipolar separator plates are, for example, used in fuel cell stacks. They serve for current conduction out of the individual fuel cells of the stack and for electrically connecting the fuel cells in series for the purpose of a voltage increase. Bipolar separator plates may be made as smooth plates or they may be contoured at one or both of their main sides. By means of such a contouring, for example, gas-conveying channels may be formed in the main sides of the bipolar separator plates.

Generally, bipolar separator plates may be made of metal. Bipolar separator plates made of metal, which are not made of or laboriously coated with particularly resistant and correspondingly expensive metals like gold or titanium, tend to corrosion. Further, in case of bipolar separator plates made of metal, additional seals for sealing the fuel cell stack transversely to its stack direction are required as a rule.

These drawbacks of bipolar separator plates made of metal are eliminated with bipolar separator plates made of electrically conductive plastic. Here, the electrical conductivity of the plastic is, as a rule, based on electrically conductive particles, with which the plastic is filled.

BACKGROUND OF THE INVENTION

A process for fabricating a resin bound carbon fiber article and in particular electrochemical cell electrodes requiring different mean pore sizes in different areas is known from United States patent U.S. Pat. No. 4,426,340. In the known process, different mixtures of carbon fibers and resin are heated and compacted in different areas of an article forming mold. The carbon fibers in the different mixtures have different bulk densities. The different mixtures are one after the other deposited on the continuously moving band-shaped article forming mold and then, in a compacting device, compacted with rollers between which mixtures are passed together with the band-shaped article forming mold. The ready articles or electrodes may have ribs running into a longitudinal direction of the band-shaped article forming mold.

A method of manufacturing a flow field plate in which graphite and resin materials are mixed to provide a molten mixture is known from European patent EP 2 801 121 B1. The molten mixture is formed into a continuous flow field plate. The continuous flow field plate is separated into discrete flow field plates. Flow field channels are either provided in the continuous flow field plate or the discrete flow field plates. Forming the mixture into the continuous flow field plate includes extruding the mixture through a die, wherein, at the exit of the die, the resin has a temperature above the temperature where it begins to melt, and below the temperature where it is completely melted. A liquid/solid ratio is between 40:60 and 60:40. The resin is preferably selected from fluorinated ethylene propylene, perfluoroalkoxy copolymer and polytetrafluoroethylene. The desired profile of the flow field plate is achieved by extruding the mixture through a die having the desired profile. The extrusion step includes depositing the mixture into a barrel and slidably translating a ram through the barrel to force the mixture through the die having the desired profile, wherein the slidably translating step preferably occurs without rotating the ram about its axis. Alternatively, at first a paste is manufactured by means of the extrusion, which paste is then formed in a double belt press under the influence of pressure and temperature into the flow field plate provided with the flow field channels.

A method for producing a bipolar separator plate or a blank therefor, in which carbon fibers and a thermosetting resin are spread into a preform and then hot-pressed between a lower belt and an upper belt of a double belt press are known from international patent application publication WO 2015/088 472 A1 and United States patent application publication US 2016/0 233 518 A1, which both belong to the same patent family. The method includes dispensing carbon fibers having a length of between about 3 and 12 mm from a first hopper into a mixing chamber of a double-hopper, bladed-roller scattering machine and simultaneously depositing a thermoset resin powder from a second hopper of the scattering machine into the mixing chamber, wherein the fibers and powder are mixed to homogenous predetermined proportions of between about 40% and 60% each. Then the mixture is directed to flew onto a moving support belt of a double belt press apparatus, and the mixture is compressed between the moving support belt and a moving compression belt of the double belt press apparatus and the mixture passes between the belts for an adequate residence time duration to first melt and then cure the thermoset resin to form a fuel cell precursor substrate. Carbonizing and then graphitizing the precursor substrate forms the final substrate. The only ratio of a ratio of carbon fibers and thermosetting resin indicated is 45% carbon fibers to 55% phenolic powder.

An molded body made of a highly conductive molding mass that contains a plastic and a filler incorporated into the plastic are known from German patent application publication DE 10 2009 051 434 A1. The molding mass is electrically conductive and thermoformable. The molded body is produced by incorporating the filler into the plastic, forming the molding mass by a primary shaping, and forming the molding mass through a deformation process. Prior to the forming, the molding mass is tempered. The forming of the molding mass may be executed by calendering or extruding.

A method of producing a composite semi-finished product including a thermoplastic and a dispersed phase made of at least one electrically conductive filler are known from German patent application publication DE 10 2013 107 514 A1 and United States patent application publication US 2016/0 156 040 A1, which both belong to the same patent family. In the method, at first the thermoplastic and the filler are separately cryogenically ground. Then, the thermoplastic and the filler are mixed in form of fine particles. The mixture is heated up to a temperature higher than the melting temperature of the thermoplastic. After shaping, the heated up material is cooled down to a temperature below the solidification temperature of the thermoplastic. The electrically conductive filler preferably consists of carbon, graphite, carbon black, titanium carbide or a metal. The thermoplastic consists of polyethylene (PE), polypropylene (PP), polyphenylene sulphide (PPS), polyether ether ketone (PEEK), polyvinyl chloride (PVC) and/or polyamide (PA). The particles to which the thermoplastic is ground are by 90% smaller than 500 µm, preferably smaller than 300 µm and particularly smaller than 200 µm. The heating and cooling down is executed by means of a rolling mill including a heatable roller and a coolable roller. The shaping is executed in an extruder.

United States patent application publication US 2003/0 129 471 A1 discloses a composite material for fuel cell separator molding, which comprises a carbonaceous powder dispersed in a matrix. Said matrix comprises a resin coat cover for coating said carbonaceous powder and a resin reinforcing phase having higher heat resistance than a resin which forms said resin coat cover. Further, a production method of the composite material, a fuel cell separator which uses the composite material, and a production method thereof are disclosed. A lower limit of a ratio of a total of resins of the resin coat cover and resin reinforcing phase is generally 1.1 parts by weight or more, preferably 2 parts by weight or more, more preferably 5 parts by weight or more, based on 100 parts by weight of the carbonaceous powder. When the containing ratio is smaller than this, it becomes difficult to obtain mechanical strength of the obtained fuel cell separator. An upper limit of the ratio of the total of the resins of the resin coat cover and resin reinforcing phase is generally 150 parts by weight or less, preferably 140 parts by weight or less, more preferably 130 parts by weight or less, based on 100 parts by weight of the carbonaceous powder. When the containing ratio is larger than this, the conductivity of the obtained fuel cell separator is reduced. The composite material for fuel cell separator molding is generally a pellet or powder form. In case of a power form, it is desirable that it has a size which shows good treating ability by compression molding and can effect uniform packing in a die, and its average particle size is generally 0.05 mm or more, preferably 0.1 mm or more, more preferably 0.2 mm or more, and generally 1 mm or less, preferably 0.9 mm or less, more preferably 0.8 mm or less, its maximum particle size is generally 2 mm or less, preferably 1.5 mm or less, and its minimum particle size is generally 0.02 mm or more, preferably 0.03 mm or more. Such a powder can be prepared by pulverizing pellets using a grinder, or it may be a product of granulation.

Besides the continuous manufacture of bipolar separator plates or of blanks for bipolar separator plates as a band-shaped plate material which is sub-divided into individual plates, methods are known in which plates usable as bipolar separator plates or as blanks for bipolar separator blades are individually produced by hot-pressing of starting materials in a mold. These bipolar separator plates or blanks, as a rule, have a higher isotropy of their electrical properties and particularly a higher electrical conductivity normal to their plane of main extension than bipolar separator plates and blanks which have been shaped by extruding or calendering. In the mass production of bipolar separator plates and their blanks, however, an individual production by pressing the starting materials in a mold is a high estoppel for the achievement of high production rates.

There still is a need of a method of continuously producing a band-shaped plate material, which can be divided-up into bipolar separator plates or blanks for bipolar separator plates from plastic filled with electrically conductive particles, that is suitable for high production rates and which nevertheless results in a plate material having a high electrical conductivity, particularly orthogonally to its plane of main extension, i.e. between its main sides.

SUMMARY OF THE INVENTION

The present invention relates to a method of continuously producing a band-shaped plate material from plastic filled with electrically conductive particles. The band-shaped plate material can be sub-divided into bipolar separator plates or blanks for bipolar separator plates. The method comprises the steps of compounding the particles and the plastic into a compound, wherein the particles make up between 75% and 90% by weight of the compound, cryogenically grinding the compound into a powder, spreading out the powder into a preform, and hot-pressing the preform between a lower belt and an upper belt of a double belt press into the plate material.

The present invention also relates to a further method of continuously producing a band-shaped plate material from plastic filled with electrically conductive particles, which can be subdivided into bipolar separator plates or blanks for bipolar separator plates. This method comprises the steps of compounding the particles and the plastic into a compound, wherein the particles make up between 75% and 90% by weight of the compound, high-energetically grinding the compound into a powder at an expenditure of energy of between 4.000 J/g compound to 8.000 J/g compound, spreading out the powder into a preform, and hot-pressing the preform between a lower belt and an upper belt of a double belt press into the plate material.

The present invention also relates to an even further method of continuously producing a band-shaped plate material from plastic filled with electrically conductive particles, which can be subdivided into bipolar separator plates or blanks for bipolar separator plates. This method comprises the steps of selecting the plastic from thermoplastics on the basis of polyolefins; selecting the particles from carbon black, graphite particles and CNTs; compounding the particles and the plastic into a compound, wherein the particles make up between 75% and 90% by weight of the compound; cryogenically grinding the compound into a powder at a temperature below −70° C., wherein the powder has a particle size distribution in which at least 90% per weight of the particles are smaller than 100 µm; spreading out the powder into a preform; isobarically hot-pressing the preform between a lower belt and an upper belt of a double belt press into the plate material, wherein the plate material into which the preform has been hot-pressed has a thickness in a range between 0.4 mm and 2.5 mm; and cooling the plate material, into which the preform has been hot-pressed, between the upper belt and the lower belt of the double belt press by at least 20 degrees Kelvin, wherein, in cooling down the plate material, an increased pressure at which the preform has been hot-pressed into the plate material is kept, until the plate material exits out of the double belt press.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
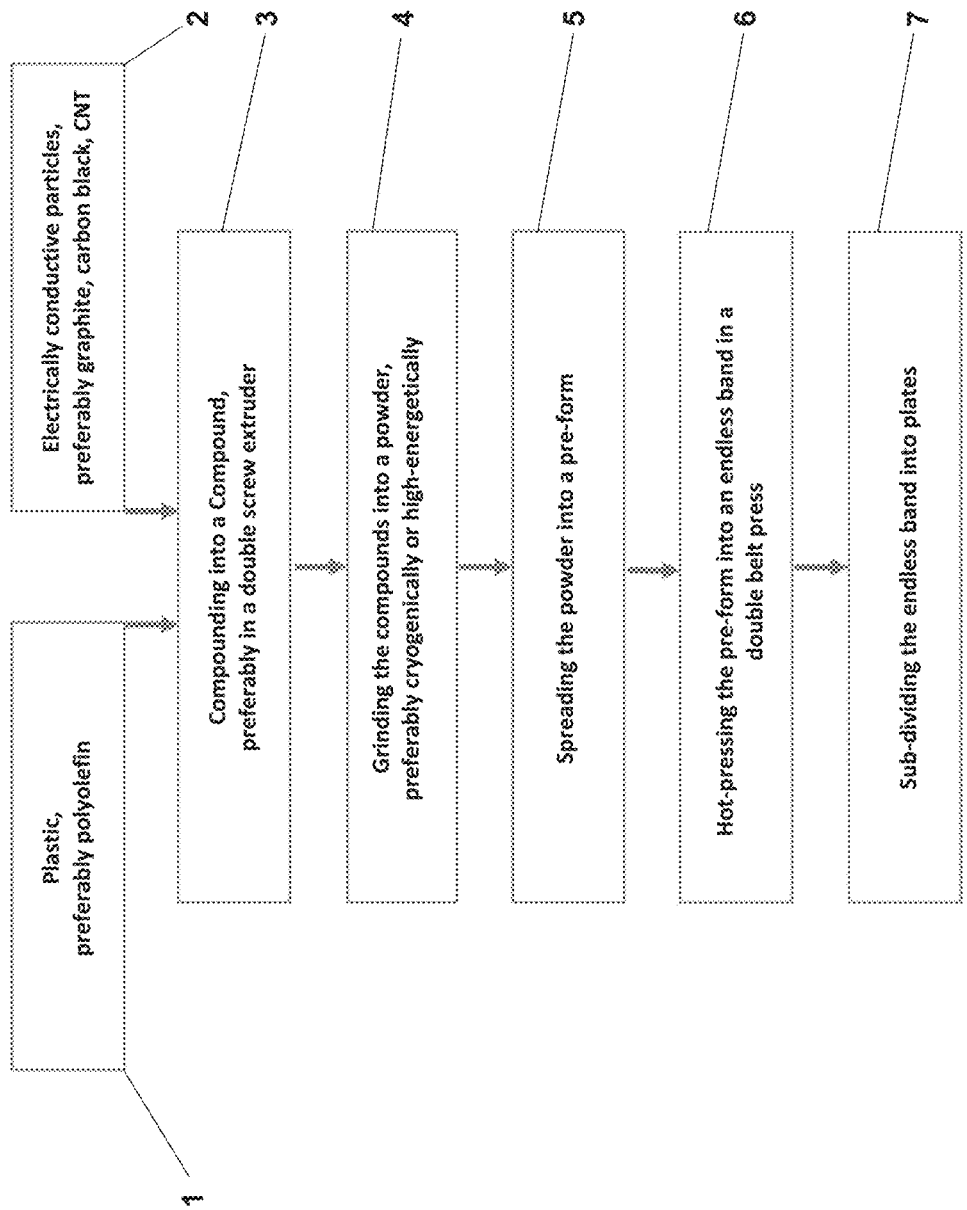
FIG. 1 is a flow chart of an embodiment of the method of continuously producing a band-shaped plate material from plastic filled with electrically conductive particles, which can be sub-divided into bipolar separator plates or blanks for bipolar separator plates.

In a method of continuously producing a band-shaped plate material which can be divided-up into bipolar separator plates or blanks for bipolar separator plates from plastic filled with electrically conductive particles according to the present disclosure, the particles and the plastic are compounded into a compound, the compound is ground into a powder, the powder is spread out into a preform, and the preform is hot-pressed into the plate material between a lower belt and an upper belt of a double belt press. The band-shaped plate material may directly or after cooling down or after a further treatment in a still hot or a cooled down state be divided-up into individual plates which are then usable as bipolar separator plates or as blanks for bipolar separator plates. The dividing-up of the plate material accruing in band-shape into the individual plates may, however, also take place at a greater temporal or spatial distance to the previous method steps. Then, the plate material may first be wound up into a coil and later be unwound again for further processing and/or dividing-up. The winding into a coil requires a high flexibility of the plate material which is, however, achievable in the method according to the present disclosure by using a plastic adapted to this purpose. At the same time, a high flexibility of the plate material comes with a high gas impermeability, i.e. both with a high gas impermeability of the later bipolar separator plates orthogonally to the plane of main extension and with a high gas impermeability of a fuel cell stack made thereof, in which the bipolar separator plates take over sealing-function, transversely to the stack direction.

In the method according to the present disclosure, considerable effort is spent for making the preform which is then hot-pressed between the lower belt and the upper belt of the double belt press into the plate material. This high effort includes the first step of compounding into a compound. However, the preform is not directly made of this compound but the compound is first ground into a powder, and only this powder is spread into the preform. This procedure results in a very high homogeneity of the distribution of the electrically conductive particles in the plastic and particularly into a high isotropy of the electrical properties of the plastic filled with the electrically conductive particles, inclusive of a high electrical conductivity between the main sides of the ready plates. The high homogeneity and isotropy do not arise, if it is done without grinding the compound after the compounding or if the plastic and the electrically conductive particles are ground without prior compounding, i.e. if they are spread into the preform directly after being mixed as powders.

The use of the double belt press for hot-pressing the preform into the plate material is also decisive. In a double belt press, there is no relative movement of the preform relative to the lower belt and the upper belt in pressing, which would have the effect of a shearing of the preform and an anisotropy of the produced plates resulting therefrom. Insofar, the movement of the preform—or better the non-movement of the preform with respect to the forming surfaces—is comparable to linearly pressing the starting materials in a mold. Thus, the plate material produced according to the method according to the present disclosure distinguishes itself as desired by a higher isotropy of its electrical conductivity and a corresponding high electrical conductivity between its main sides. As already mentioned, the plate material also has a high flexibility and gas impermeability.

Practically, the electrically conductive particles and the plastic may be compounded into the compound in a screw extruder. Even more practically, the screw extruder may be a double screw extruder whose screws are rotatingly driven in a same sense of rotation in compounding. In a screw extruder, particularly in a double screw extruder with screws rotatingly driven in a same sense of rotation, a homogenous compound with an already very uniform distribution of the electrically conductive particles in the plastic is achieved.

The electrically conductive particles may particularly be particles on the basis of carbon, practically carbon black, graphite particles or CNTs, i.e. carbon nanotubes. Generally, any other electrically conductive fillers may also be used, as they are known from the prior art. The filling factor at which the electrically conductive particles on the base of carbon are used in the method according to the present disclosure, i.e. their proportion of the plate material produced in percent by weight is preferably between 75% and 90% and is thus quite high as compared to known bipolar separator plates made of plastic filled with electrically conductive carbon material. The electrical conductivity of the plate material increases with the filling factor. The flexibility and the gas impermeability of the plate material tend to decrease with the filling factor; however, in the method according to the present disclosure, even the flexibility and the gas impermeability are also not only sufficient but surprisingly high with filling factors of up to nearly 90%.

The plastic used in the method according to the present disclosure may generally be a thermosetting plastic, for example on the basis of phenolic resin. Often, however, it is a thermoplastic, preferably a thermoplastic on a basis of polyolefins, particularly if importance is attached to flexibility of the plate material. Practically, the plastic may at least to more than 50% by weight consist of polyethylene (PE) or polypropylene (PP). Even polyphenylene sulphide (PPS) and polyvinylidene fluoride (PVDF) may be used to make use of their thermal and chemical resistance. By composing the plastic, a sufficiently high impact strength is to be adjusted. For this purpose, particularly impact resisting plastic compositions and, if needed, even special additives modifying the impact strength may be used.

The compound is preferably cryogenically, i.e. at temperature clearly below 0° C., particularly below −70° C., or high-energetically, i.e. at a high expenditure of energy, typically of multiple thousand J/g compound, for example of 4,000 J/g to 8,000 J/g or about 6,000 J/g compound, ground into the powder. Both the cryogenic and the high-energetic grinding have the purpose to powderise the compound into small particles quickly and without ongoing alterations. A particle size distribution in which at least 90% by weight of the particles are smaller than 100 μm is strived for. These particle sizes can be realized with commercially available cryogenically and/or high-energetically grinding mills even with impact strong plastics.

In the method according to the present disclosure, the spread out preform may be introduced without pre-compacting into a roller nip between the rollers of a first heated roller pair of the double belt press, that backwardly support the upper belt and the lower belt.

In order to securely transferring the not yet cohering spread out preform securely into the double belt press, the preform may be formed on a pulled-out lower belt of the double belt press or on a separate conveyor belt and be guided through the double belt press thereon.

A conveying speed at which the preform is conveyed between the upper belt and the lower belt through the double belt press is in a typical range between 1.5 mm/s and 333 mm/s, preferably between 8.3 mm/s and 167 mm/s and most preferred between 16.7 mm/s and 117 mm/s.

Upon entry into the double belt press, the preform is compacted in that air is pressed out of the preform spread of powder. Herein, a thickness of the preform as compared to the plate material is reduced, as a rule, by 50% to 85% and, typically, by 70% to 80%. In a hot press area of the double belt press, the preform may then, depending on the plastic used, purposefully be heated up to a temperature in a range from at least about 100° C. to 400° C. and be hot-pressed into the plate material. With thermosetting plastics, the temperature at which the hot-pressing takes place may be quite low between 100° C. and 200° C. With thermoplastics on a basis of polyolefins, the temperature of the hot-pressing typically is between 170° C. and 260° C., and with high temperature resistive thermoplastics, it is between 330° C. and 400° C. Here, the temperature of the belts of the double belt press may be set differently in consecutive zones of the hot-press area, for example at first slightly higher to heat up the preform more quickly, and then closer to the target temperature which shall be achieved in the preform in hot-pressing.

The hot-pressing of the preform into the plate material may take place at a pressure increasing up to a final pressure. Preferably, the hot-pressing of the preform into the plate material, however, takes place at a pressure which is kept constant over a longer distance or even over the entire distance covered by the preform within the double belt press. Thus, the preform is preferably isobarically hot-pressed into the plate material. Correspondingly, the double belt press used is preferably a so called isobaric double belt press. In any case, the pressure which is achieved in the hot-pressing of the preform into the plate material may be in a range between 0.5 MPa and 10 MPa above the ambient pressure. As a rule, the pressure which is achieved in the hot-pressing of the preform into the plate material is at least 2 MPa.

In the method according to the present disclosure, a typical staying time of the preform in the hot-press area which is the quotient of the length of the hot-press area and the conveying speed at which the preform is conveyed through the double belt press between the upper belt and the lower belt is in a typical range between 6.5 s and 1,300 s, preferably between 13 s and 250 s and particularly preferred between 18 s and 130 s.

A consolidation area in which the plate material cools down between the upper belt and the lower belt of the double belt press down to a temperature which is by at least some 10 K lower than that one in the hot-press area and preferably down to a temperature in a range between 100° C. and ambient temperature and/or decompressed to a lower pressure than in the hot-pressed area may follow to the hot-press area. The reduction of the temperature and/or the pressure may also occur in steps. It proves to be suitable to only reduce the temperature in the consolidation area but to keep the same pressure as in the hot-press area in the sense of an isobaric procedure. Thus, the plate material preferably only exits out of the double belt press after its partial cooling down. In the practice of the method according to the present disclosure, the isobaric procedure up into the consolidation area of the double belt press has transpired as essential to produce highly filled and nevertheless both flexible and gas impermeable plate material for bipolar separator plates at a high process reliability.

A staying time of the plate material in the consolidation area which is the quotient of the length of the consolidation area and the conveying speed at which the preform is conveyed through the double belt press between the upper belt and the lower belt is typically in a range between 3 s and 600 s, preferably between 6 s and 115 s and particularly preferred between 8 s and 60 s. It is to be understood that, with a given double belt press, the staying times in the hot-pressing area and the consolidation area are often in a fixed ratio. This ratio is typically higher than 1:1. Often it is at or slightly below 2:1.

In the method according to the present disclosure, the still hot material may be contoured at at least one of its two main sides. Thus, as a rule, this contouring takes place upstream of the consolidation area, or the plate material has to be reheated prior to the contouring. An embossing roller may be used for the contouring. The plate material may also be passed between two embossing rollers to be contoured on both of its two main sides. Here, the upper belt and the lower belt may end in front of the respective embossing roller, and a new upper belt or lower belt may start behind the embossing roller to lead the plate material through the consolidation area. It is to be understood that, in the method according to the present disclosure, the embossing rollers have a circumferential speed which corresponds to the conveying speed of the double belt press as exactly as possible to avoid a shearing of the plate material in contouring. Due to the homogeneous composition of the plate material, a displacement of material of the plate material concomitant with the contouring does not or does essentially not have a negative effect on the electrical conductivity of the produced plates between their main sides.

The plate material and correspondingly the plates obtained therefrom by sub-dividing comprise a typical thickness between 0.4 mm and 2.5 mm; i.e. by means of the method according to the present disclosure, both comparatively thin and comparatively thick plates may be produced which are usable as bipolar separator plates or blanks therefor.

Now referring in greater detail to the drawings, FIG. 1 depicts a method xxx in a block diagram. A plastic 1 which is preferably a polyolefin, and electrically conductive particles 2 which are preferably graphite, carbon black and/or CNT, are compounded into a compound in a first method step 3. This compounding preferably takes place in a double screw extruder whose screws are rotatingly driven in a same sense of rotation. In a next step 4, the compound is ground. The grinding preferably occurs cryogenically and/or high-energetically in such a way that a particle size D90 of <100 μm is achieved, i.e. at least 90% by weight of the particles of the powder have a particle size of <100 μm. In a consecutive method step 5, the powder is spread out into a two-dimensional preform. Then, in a step 6, the preform is hot-pressed in a double belt press into a band-shaped plate material. Finally, in a step 7, the plate material is divided-up into plates. This step 7 may take place temporarily and spatially separated from the other steps 3 to 6. For example, the plate material may at first be wound up into a coil and then later be contoured at one or both of its main sides before it is divided up into plates which can then be used as bipolar separator plates or as blanks for a bipolar separator plate. Generally, the preceding steps 3, 4, 5 and 6 may be executed temporarily and spatially separated from one another, wherein it is, however, suitable to let the steps 5 and 6 directly follow to each other both temporarily and spatially.

Figure 2:
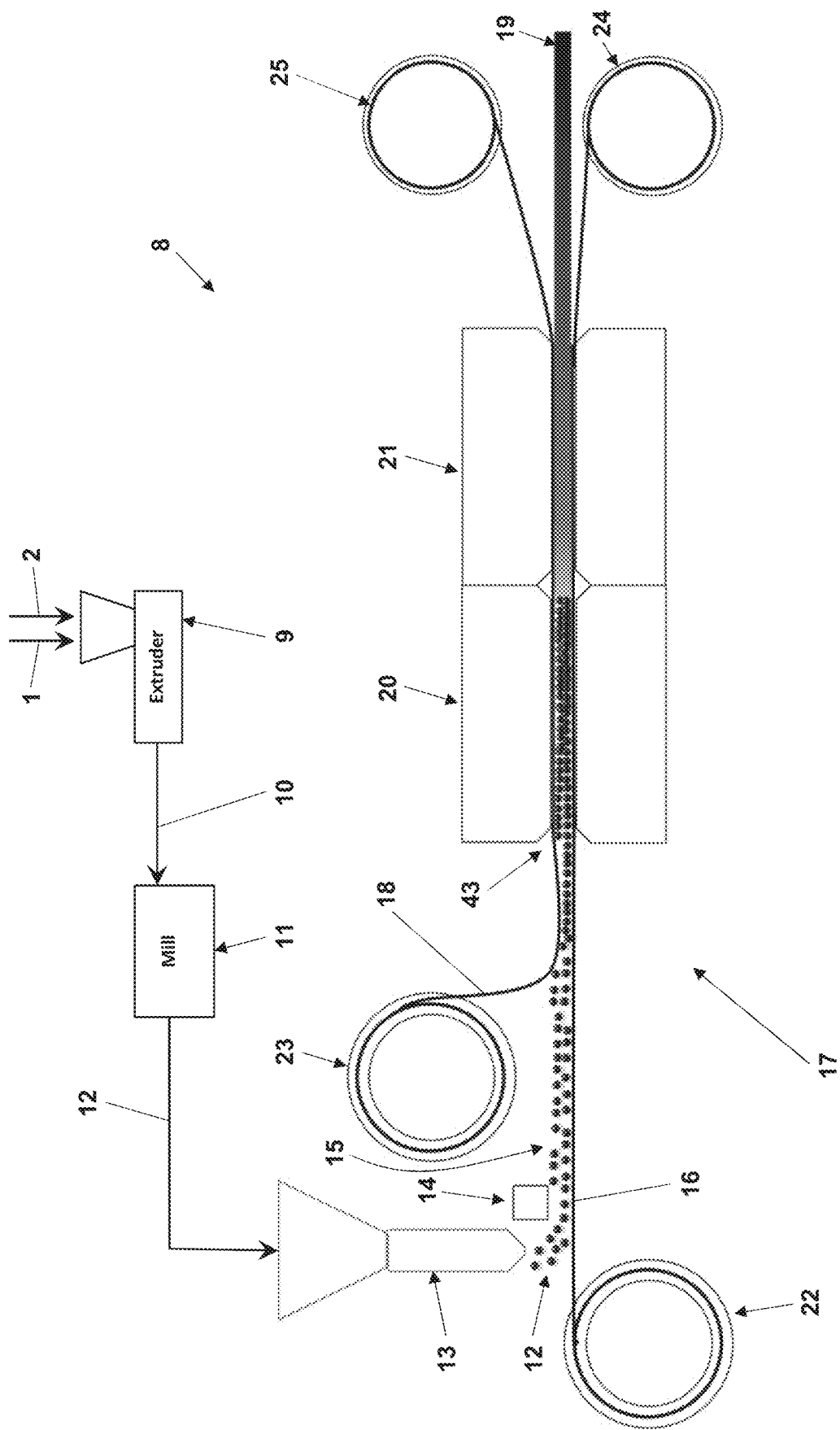
FIG. 2 schematically shows a facility for carrying out the method according to FIG. 1.

The facility 8 schematically depicted in FIG. 2 includes a double screw extruder 9 in which the plastic 1 and the particles 2 are compounded into the compound 10. In a mill 11, the compound 10 is cryogenically or high-energetically or both cryogenically and high-energetically ground into the powder 12. By means of a spreading device 13 and a doctor blade 14, the powder 12 is spread out into the preform 15 of defined thickness onto a pulled-out lower belt 16 of a double belt press 17. Between the lower belt 16 and the upper belt 18 of the double belt press 17, the preform 15 is then hot-pressed into the plate material 19. Directly following to a lead-in-area 43, the double belt press 17 has a heated hot-press area 20 followed by a cooled consolidation area 21. In the lead-in area 43, the preform 15 may at first be compacted with increasing pressure without heating before it is then hot-pressed into the plate material 16 at increased pressure and increased temperature. In the cooled consolidation area 21 of the belt press, a consolidation of the plate material 19 at decreasing temperature takes place, wherein the increased pressure is kept. The double belt press 17 is sketched here in such a way that its lower belt 16 and its upper belt 18 are pulled through the hot-press area 20 and the consolidation area 21 and are unwound from supply coils 22 and 23 and coiled on draw rollers 24 and 25. It is to be understood that the lower belt 16 and the upper belt 18 may also be endless belts and run back on the outside of the hot-press area 20 and the consolidation area 21.

Figure 3:
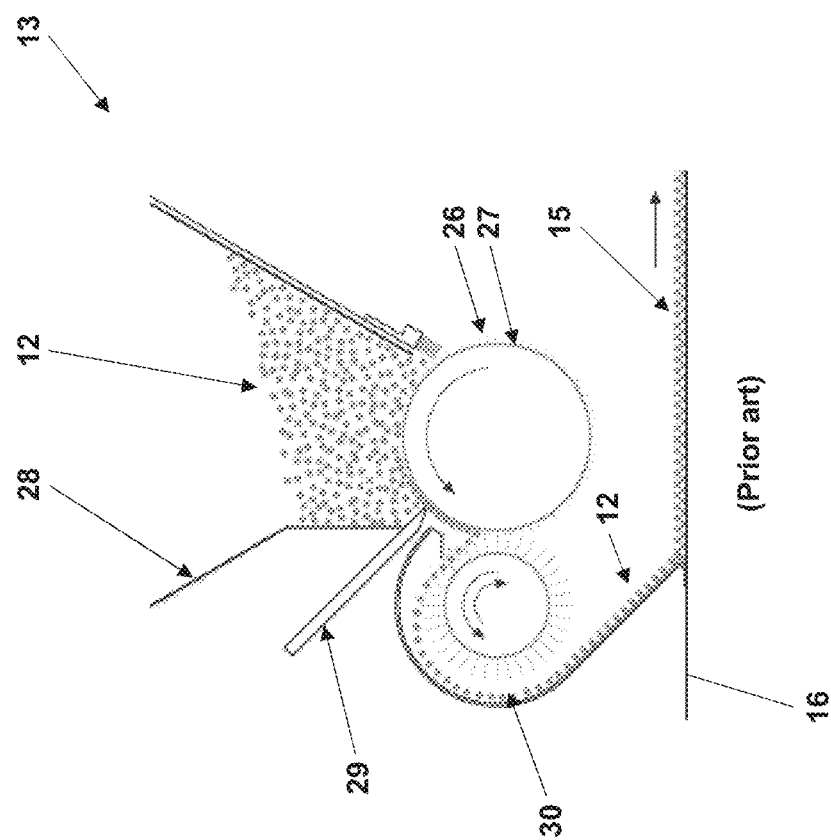
FIG. 3 shows an embodiment of a detail of the facility according to FIG. 2 relating to a formation of a preform.

FIG. 3 illustrates a possible practical embodiment of the spreading device 13 as it is generally known from the prior art and as it can be used in the method according to the present disclosure for spreading the preform 15 of the powder 12. A metering roller 26 with recesses in its roller shell 27 rotates at a lower outlet of a powder reservoir 28. A scraper 29 only lets that powder 12 out of the powder reservoir 28 which is located in the recesses in the roller coat 27. Behind the scraper 29, the powder 12 is taken off the metering roller 26 by a brush roller 30 and thus spread into the preform 15 on the lower belt 16 in a metered way.

Figure 4:
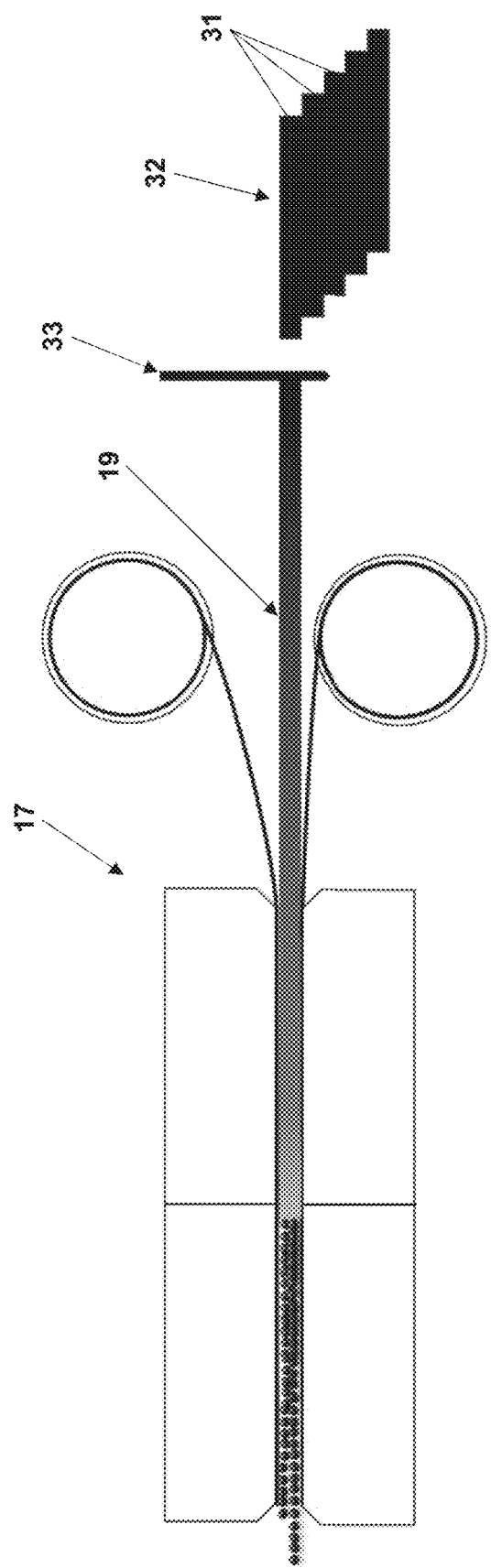
FIG. 4 shows an embodiment of a detail of the facility according to FIG. 2 relating to a direct dividing-up of a plate material into plates usable as bipolar separator plates or as blanks for bipolar separator plates.

FIG. 4 illustrates how, following to the double belt press 17, the plate material 19 can be divided-up into the plates 31 and stacked up to a stack 32 directly following to the double belt press 17. For this purpose, a knife 33 is provided which intermittently runs forward together with the plate material 19 while dividing-up the plate material 19 and then quickly runs back.

Figure 5:
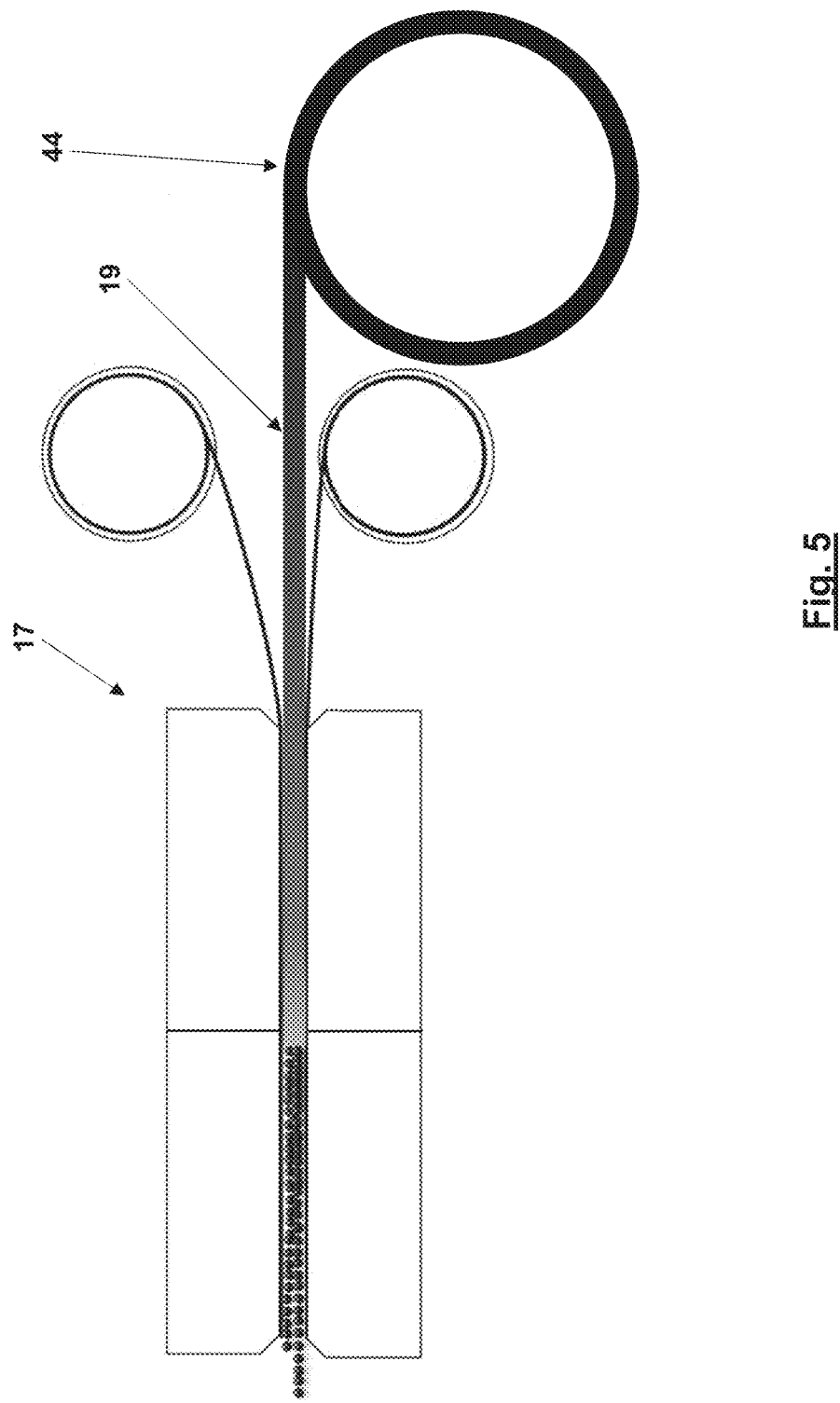
FIG. 5 shows an embodiment of a detail of the facility according to FIG. 2 relating to a winding-up of the plate material into a coil.

FIG. 5 illustrates how, following to the double belt press 17, the plate material 19 is at first wound up into a coil 44. The coil 44 may then be intermediately stored and only later be unwound for dividing-up the plate material 19 into the plates 31 or for first further processing the plate material 19.

Figure 6:
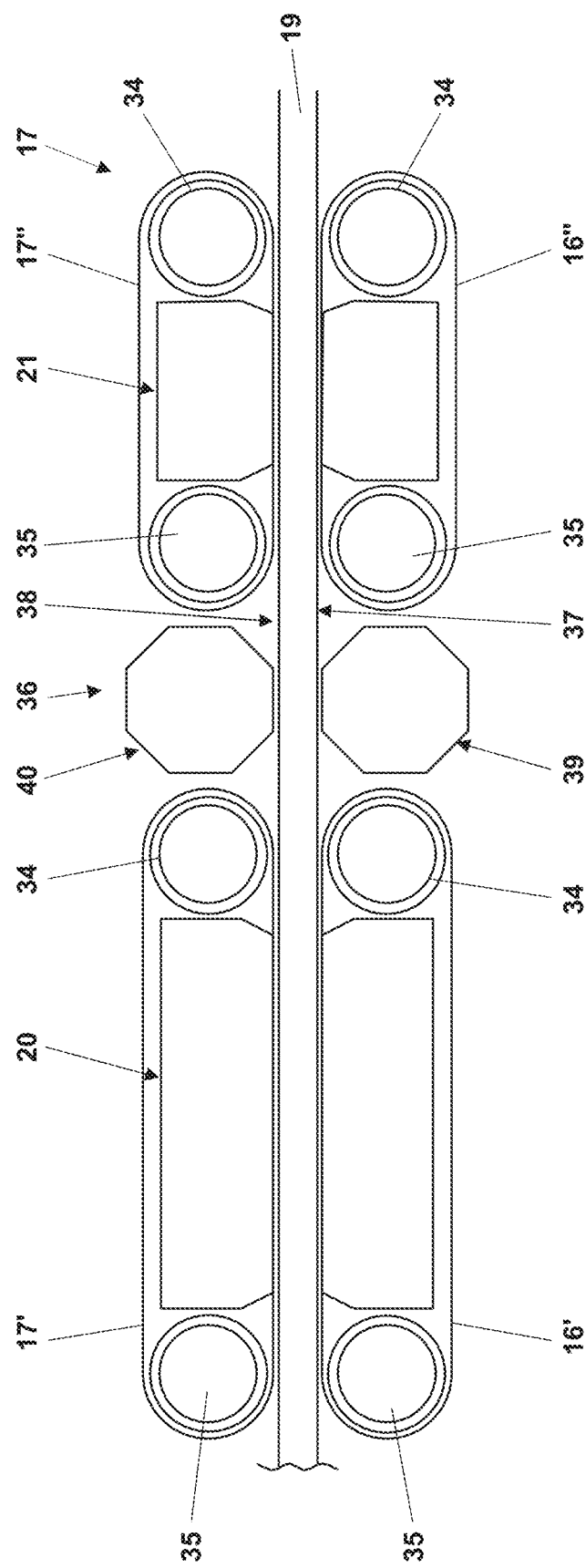
FIG. 6 shows an embodiment of a double belt press of the facility according to FIG. 2 with contouring devices.

FIG. 6 shows an embodiment of the double belt press 17 whose parts 20 and 21 are spaced apart from each other in such a way that also the lower belt 16 and the upper belt 18 are each divided in two separate parts 16' and 18', and 16" and 18", respectively. Here, the parts 16 and 16' of the lower belt 16 and the parts 18 and 18' of the upper belt 18 are each running as endless belts around drive rollers 34 and guide rollers 35. Between the parts 20 and 21 of the double belt press 17, a contouring device 36 is provided which contours the plate material 19 at its main sides 37 and 38. For this purpose, the plate material 19 passes through a roller nip between embossing rollers 39 and 40.

Figure 7:
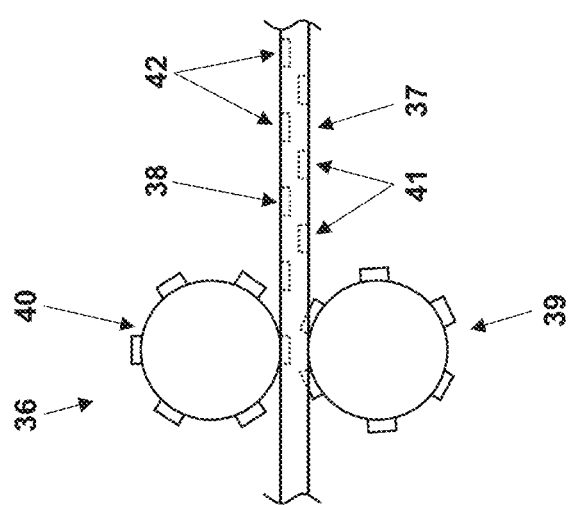
FIG. 7 shows a practical embodiment of the contouring devices according to FIG. 6.

FIG. 7 schematically illustrates how, by means of the embossing rollers 39 and 40 of the contouring device 26, for example, channels 41 and 42 may be formed in the main sides 37 and 38. This, however, is only an example of a contouring by means of the contouring device 36.

The plate material 19 produced by the method of the according to the present disclosure distinguishes itself by a high electric conductivity and a particularly high isotropy of its electrical conductivity such that this electrical conductivity is also present and usable in the direction between the main sides 37 and 38 of the plate material and the plates produced thereof by dividing-up. Further, when using a suitable plastic, the plate material 19 is sufficiently flexible to be wound up into the coil 44 without damages, gas impermeable as such and suitable for forming gas seals in a fuel cell stack.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of continuously producing a band-shaped plate material from plastic filled with electrically conductive particles, the band-shaped plate material being sub-dividable into bipolar separator plates or blanks for bipolar separator plates, the method comprising
compounding the electrically conductive particles and the plastic into a compound, wherein the electrically conductive particles make up between 75% and 90% by weight of the compound,
cryogenically grinding the compound into a powder,
spreading out the powder into a preform, and
hot-pressing the preform between a lower belt and an upper belt of a double belt press into the band-shaped plate material.

2. The method of claim 1, wherein the compound is cryogenically ground into the powder at a temperature below −70° C.

3. The method of claim 2, wherein the compound is cryogenically ground into the powder at an expenditure of energy of at least 2.000 J/g Compound.

4. The method of claim 2, wherein the compound is cryogenically ground into the powder at an expenditure of energy of between 4.000 J/g compound to 8.000 J/g compound.

5. The method of claim 1, wherein the electrically conductive particles and the plastic are compounded into the compound in a screw extruder.

6. The method of claim 1, wherein the electrically conductive particles and the plastic are compounded into the compound in a double screw extruder whose screws are rotationally driven in a same sense of rotation.

7. The method of claim 1, wherein the electrically conductive particles are selected from carbon black, graphite particles and CNTs.

8. The method of claim 1, wherein the plastic is a thermoplastic.

9. The method of claim 1, wherein the plastic is a polyethylene (PE) or a polypropylene (PP).

10. The method of claim 1, wherein the powder has a particle size distribution in which at least 90% per weight of the powder are made up by particles that are smaller than 100 μm.

11. The method of claim 1, wherein the plastic is a thermoplastic on the basis of polyolefins and wherein the preform is hot-pressed into the band-shaped plate material at a temperature in a range between 170° C. and 260° C.

12. The method of claim 1, wherein the preform is hot-pressed into the band-shaped plate material at an increased pressure which is increased by a pressure increase in a range between 0.5 MPa to 10 MPa over ambient pressure.

13. The method of claim 12, wherein the preform is isobarically hot-pressed into the band-shaped plate material.

14. The method of claim 12, wherein the preform is hot-pressed into the band-shaped plate material within a period of time in a range between 13 s and 215 s.

15. The method of claim 13, wherein the band-shaped plate material, into which the preform has been hot-pressed, is cooled between the upper belt and the lower belt of the double belt press down to a temperature in a range between 100° C. and ambient temperature.

16. The method of claim 15, wherein, in cooling down the plate material, the increased pressure at which the preform has been hot-pressed into the plate material is kept, until the plate material exits out of the double belt press.

17. The method of claim 16, wherein the plate material is cooled between the lower belt and the upper belt of the double belt press for a period of time in a range between 6 s and 115 s.

18. The method of claim 1, wherein the plate material is sub-divided into the bipolar separator plates or the blanks for bipolar separator plates, respectively, or rolled up into a coil downstream of the double belt press.

19. The method of claim 1, wherein the band-shaped plate material is contoured at at least one of its two main sides, when the band-shaped plate material is still hot.

20. The method of claim 1, wherein the plate material into which the preform has been hot-pressed has a thickness in a range between 0.4 mm and 2.5 mm.

21. A method of continuously producing a band-shaped plate material from plastic filled with electrically conductive particles, the band-shaped plate material being sub-dividable into bipolar separator plates or blanks for bipolar separator plates, the method comprising
compounding the electrically conductive particles and the plastic into a compound, wherein the electrically conductive particles make up between 75% and 90% by weight of the compound,
high-energetically grinding the compound into a powder at an expenditure of energy of between 4.000 J/g compound to 8.000 J/g compound,
spreading out the powder into a preform, and
hot-pressing the preform between a lower belt and an upper belt of a double belt press into the band-shaped plate material.

22. A method of continuously producing a band-shaped plate material from plastic filled with electrically conductive particles, the band-shaped plate material being sub-dividable into bipolar separator plates or blanks for bipolar separator plates, the method comprising
selecting the plastic from thermoplastics on the basis of polyolefins,
selecting the electrically conductive particles from carbon black, graphite particles and CNTs,
compounding the electrically conductive particles and the plastic into a compound, wherein the electrically conductive particles make up between 75% and 90% by weight of the compound,
cryogenically grinding the compound into a powder at a temperature below −70° C., wherein the powder has a particle size distribution in which at least 90% per weight of the powder are made up by particles that are smaller than 100 μm,
spreading out the powder into a preform,
isobarically hot-pressing the preform between a lower belt and an upper belt of a double belt press into the band-shaped plate material, wherein the band-shaped plate material into which the preform has been hot-pressed has a thickness in a range between 0.4 mm and 2.5 mm, and
cooling the band-shaped plate material, into which the preform has been hot-pressed, between the upper belt and the lower belt of the double belt press by at least 20 degrees Kelvin, wherein, in cooling down the band-shaped plate material, an increased pressure at which the preform has been hot-pressed into the band-shaped plate material is kept, until the band-shaped plate material exits out of the double belt press.

* * * * *